Patented Sept. 13, 1927.

1,642,574

UNITED STATES PATENT OFFICE.

CLAUDE-GEORGES BOSSIERE, OF PARIS, AND HECTOR ZANICOLI, OF LARDY, FRANCE.

METHOD FOR SEPARATING THE COMPONENTS OF ALLOYS.

No Drawing. Application filed December 15, 1924, Serial No. 756,144, and in France October 23, 1924.

The present invention relates to a method for the treatment of various alloys in order to separate the constituent metals. The chief object of the invention consists in recovering the several products utilized for the said separation, the said method chiefly comprising the following steps.

1. The alloy is treated in a sub-divided state, that is in the form of turnings or grains by a suitable mixture of sulphur with alkali sulphurous compounds such as sulphides, poly-sulphides or thio-sulphates, in such manner as to obtain insoluble sulphides as well as thio-salts which are soluble in water.

2. For the recovery of the sulphur and the alkali sulphides, poly-sulphides, or thiosulphates employed for the separation, the sulphur dioxide obtained from the oxidation of insoluble sulphides is caused to react upon the solution of thio-salts, thus enabling the subsequent recovery of the sulphur by sublimation and of the alkali sulphides by the reduction of the alkali sulphates, thiosulphates and sulphites produced into sulphides, polysulphides and thiosulphates, so that the latter products may be employed for the treatment of further quantities of alloy.

It should be noted that the auxiliary substance which has been employed for the separation of the various metals (sulphur and alkali sulphides, poly-sulphides and thiosulphates) are completely recovered, the single expense in carrying out the process corresponding to the fuel consumption. It is thus possible to considerably lower the cost of the metals thus recovered.

Other features of one improved method will be disclosed in the following description which is given as an example of the application of the said method to the treatment of bronzes composed essentially of copper, lead, tin and antimony. By melting an alloy of this nature, which has been reduced to turnings or grains, in the presence of free sulphur, a mass is obtained in which all of the said metals are converted into sulphides. But if the melting is performed in the presence of an alkali salt, certain of the metals such as the tin and antimony will be transformed into thio-salts, these being soluble in water.

For example, if turnings of an alloy containing copper, lead, tin and antimony are melted in a crucible or a suitable reverberatory furnace in the presence of sulphur and of an alkali sulphide, poly-sulphide or thiosulphate, a mass is obtained which when treated with water at a suitable temperature, preferably with the addition of an alkali sulphide, will produce on the one hand an insoluble residue containing the whole of the copper and lead of the said alloy in the state of sulphide, and on the other hand a solution containing the whole of the tin and antimony in the state of thio-salts.

If the said insoluble residue, after a suitable roasting and oxidation, whereby the sulphur is expelled in the state of sulphur dioxide, is treated with sulphuric acid, the result will be insoluble sulphate of lead and a solution of copper sulphate which latter, when crystallized, will afford a copper sulphate of an excellent commercial quality.

The above-mentioned solution containing the thio-salts, is then treated with the sulphur dioxide produced in roasting the lead and copper sulphides. The thio-salts will be decomposed with precipitation of sulphide of tin, sulphide of antimony and sulphur, and with formation of alkali salts; (mixture of sulphate, sulphite and thiosulphate). The sulphur is then recovered by sublimation, and the sulphides of tin and antimony are roasted in order to obtain the oxides of these metals. The sulphur dioxide thus produced is collected and mixed with the sulphur dioxide produced by roasting the lead and copper sulphides, and is used for precipitating further quantities of thiosalts. In order to recover the tin and antimony, their oxides may then be simply reduced by carbon and separated by a treatment with hydrochloric acid or by a refining treatment in the furnace.

Finally, in order to regenerate the alkali salts which have remained in solution after the separation of the tin and antimony, the solution of sulphate, sulphite and thiosulphate is dried and the solid residue finally obtained is reduced with carbon.

From the foregoing, it appears that the said method not only provides for the obtainment of the various metals in the commercial form, but that the products employed in the treatment may be entirely recovered and can thus be utilized in the succeeding operations.

Having now described our invention, what we claim as new and desire to secure by Letters Patent is:

1. In the treatment for separating the constituents of alloys containing metals capable of forming sulphides and metals capable of forming thio-salts, the herein described steps of heating the said alloy in a subdivided state, with a mixture of sulphur and an alkali-sulphur compound, adapted to produce sulphides of said first mentioned metals and thio-salts of said last mentioned metals, treating the resulting mixture with an aqueous liquid for effecting a desired separation of the soluble thio-salts and insoluble sulphides and recovering the metals from said sulphides and thio-salts.

2. In the treatment for separating the constituents of alloys containing metals capable of forming sulphides and metals capable of forming thio-salts, the herein described steps of melting the said alloy in a subdivided state, with a mixture of sulphur and an alkali-sulphur compound, adapted to produce sulphides of said first mentioned metals and thio-salts of said last mentioned metals, treating the resulting mixture with an aqueous liquid for effecting a desired separation of the soluble thio-salts and insoluble sulphides and recovering the metals from said sulphides and thio-salts.

3. In the treatment for separating the constituents of alloy containing metals capable of forming sulphides and metals capable of forming thio-salts, the herein described steps of heating the said alloy in a subdivided state, with a mixture of sulphur and an alkali-sulphur compound, adapted to produce sulphides of said first mentioned metals and thio-salts of said last mentioned metals, treating the resulting mixture with a solution of an alkali-sulphur compound for effecting a desired separation of the soluble thio-salts and insoluble sulphides and recovering the metals from said sulphides and thio-salts.

4. In the treatment for separating the constituents of alloys containing metals capable of forming sulphides and metals capable of forming thio-salts, the herein described steps of heating the said alloy in a subdivided state, with a mixture of sulphur and an alkali-sulphur compound, adapted to produce sulphides of said first mentioned metals and thio-salts of said last mentioned metals, treating the resulting mixture with an aqueous liquor containing an alkali sulphide for effecting a desired separation of the soluble thio-salts and insoluble sulphides and recovering the metals from said sulphides and thio-salts.

5. In the treatment for separating the constituents of alloys containing metals capable of forming sulphides and metals capable of forming thio-salts, the herein described steps of heating the said alloy in a subdivided state, with a mixture of sulphur and an alakali-sulphur compound, adapted to produce sulphides of said first mentioned metals and thio-salts of said last mentioned metals, treating the resulting mixture with an aqueous liquid for effecting a desired separation of the soluble thio-salts and insoluble sulphides, roasting the sulphides not dissolved, recovering sulphur dioxide produced in said roasting step, precipitating the thio-salts into sulphides in the aqueous leaching by means of said sulphur dioxide, and recovering the metals from the oxides produced in said roasting step and from the sulphides thus precipitated in said aqueous leaching.

6. In the treatment for separating the constituents of alloys containing metals capable of forming sulphides and metals capable of forming thio-salts, the herein described steps of heating the said alloy in a subdivided state, with a mixture of sulphur and an alkali-sulphur compound, adapted to produce sulphides of said first-mentioned metals and thio-salts, of said last-mentioned metals, treating the resulting mixture with an aqueous liquor in which said thio-salts are readily soluble and said sulphides insoluble, roasting the insoluble sulphides, recovering the sulphur dioxide produced in said roasting step, reducing and separating the metals from the oxides produced in said roasting step, treating the thio-salt solution with said sulphur dioxide, heating the precipitate of sulphide and sulphur produced in said solution for recovering the sulphur by sublimation, roasting the sulphides remaining in said precipitate, recovering the sulphur dioxide produced during said second roasting step, reducing and separating the metals from the oxides formed during said second roasting step, drying the salts which remain in solution after the treatment of the thio-salt solution with sulphur dioxide and reducing said salts for regenerating the initial alkali compound.

In testimony whereof we have signed our names to this specification.

CLAUDE-GEORGES BOSSIERE.
HECTOR ZANICOLI.